J. HIRONIMUS.
Vehicle-Spring.

No. 218,628. Patented Aug. 19, 1879.

Witnesses;

Inventor;
John Hironimus

UNITED STATES PATENT OFFICE.

JOHN HIRONIMUS, OF MOUNT VERNON, INDIANA.

IMPROVEMENT IN VEHICLE-SPRINGS.

Specification forming part of Letters Patent No. 218,628, dated August 19, 1879; application filed March 22, 1879.

*To all whom it may concern:*

Be it known that I, JOHN HIRONIMUS, of Mount Vernon, in the county of Posey and State of Indiana, have invented certain new and useful Improvements in Vehicle-Springs; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention appertains to springs for buggies and other light vehicles.

The improvement relates to the construction and combination of springs and certain adjuncts with a brace, all as hereinafter more fully described and claimed.

Figure 1:
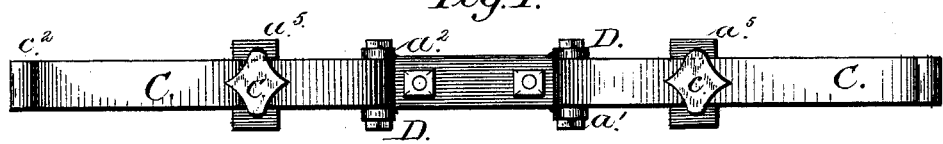
Figure 2:
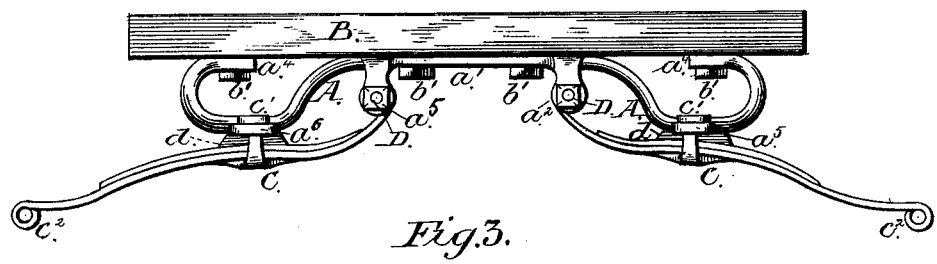
Figure 3:
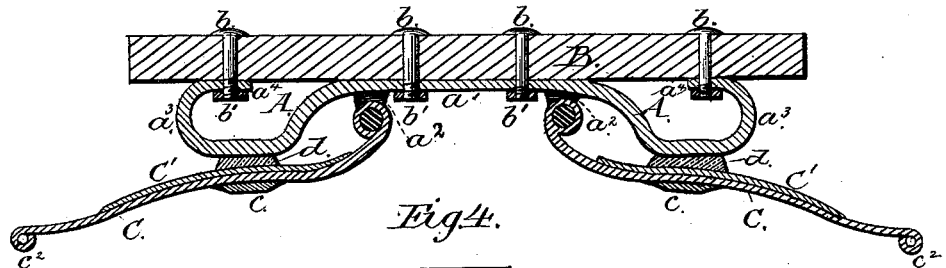
Figure 4:
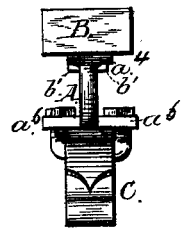

In the accompanying drawings, Figure 1 is a plan view of the under side of the brace and springs, constructed in accordance with my invention. Fig. 2 is a side elevation. Fig. 3 is a sectional view, and Fig. 4 is an end view.

Referring by letters to these several figures, in which like letters indicate like parts, A represents the brace, and B the portion of a buggy to which the said brace is securely fastened by means of the bolt $b$ and nuts $b'$. This brace is composed of a central straight portion, $a^1$, which lies flat upon the under side of the wood-work B, and through which two of the bolts $b$ pass, as shown more clearly in Fig. 3. The two end portions of the brace have a curvature approximating to a semicircle, the extreme ends being, however, straightened out, as at $a^4$, so as to allow the nuts of the bolts which pass through the same to be seated closely thereon when said nuts are tightened up. Formed integral with this brace are four dependent lugs or wings, $a^2$, which constitute two eyes for the bolts D. These bolts are headed upon one end and screw-threaded upon the other, for reception of nuts $a^5$, as shown in Fig. 2.

C C represent two springs, having their upper ends secured upon the bolts D, and their lower ends, $c^2$ $c^2$, adapted to be, respectively, secured to the axle and head-block of the vehicle. Each spring is strengthened by a short auxiliary spring, C', which has less resiliency than the main spring, whereby danger of breakage at these points is greatly lessened. Between the short spring C' C' and the curved ends of the brace A are the pieces $d$ $d$, which may be of elastic material. At such points the springs C C, pieces $d$ $d$, and brace A are bound firmly together by means of the clips $c$, the ends of which pass through lugs $a^6$ $a^6$, formed integral with the brace A.

The curved ends of the brace may be tempered so as to have some spring, in which case the springs will be of the compound-spring order.

What I claim is—

1. In combination with the springs C, secured upon the bolts D D, the brace A, formed with the straight portion $a^1$ and curved lugs $a^3$ and lugs $a^2$, all constructed and arranged as specified.

2. The brace A, formed and adapted to be secured to a vehicle-body, as set forth, in combination with the spring C, secured upon the bolts D, the short auxiliary springs C', the pieces $d$, interposed between the springs and the end portions of the brace, and the clips $c$, secured to the lugs $a^6$, all constructed and arranged as herein shown and specified.

3. In combination with the springs C C, the brace A, composed of an intermediate straight portion, $a^1$, curved ends $a^3$, and dependent lugs $a^2$, all formed in one piece, substantially as shown, and for the purpose specified.

In testimony that I claim the foregoing as my own I affix my signature in presence of two witnesses.

JOHN HIRONIMUS.

Witnesses:
DAVID WEISINGER,
WILLIAM TOPPER.